United States Patent [19]

Loose

[11] Patent Number: 4,896,765
[45] Date of Patent: Jan. 30, 1990

[54] METHOD FOR PRODUCING A DRIVING OR CONVEYOR BELT

[75] Inventor: Gerhard Loose, Hanau, Fed. Rep. of Germany

[73] Assignee: Peter-BTR Gummiwerke Aktiengesellschaft, Fed. Rep. of Germany

[21] Appl. No.: 161,187

[22] Filed: Feb. 25, 1988

[30] Foreign Application Priority Data

Feb. 27, 1987 [DE] Fed. Rep. of Germany ....... 3706404

[51] Int. Cl.$^4$ .............................................. B65G 15/34
[52] U.S. Cl. .................................................... 198/847
[58] Field of Search ................ 198/846, 847; 156/148, 156/149, 910; 474/266, 267

[56] References Cited

U.S. PATENT DOCUMENTS

| | | | |
|---|---|---|---|
| 2,310,819 | 6/1941 | Orden | 198/847 |
| 2,875,116 | 5/1955 | Smith | 198/847 |
| 3,205,119 | 2/1962 | Paul | 198/847 X |
| 3,415,700 | 12/1968 | Webster | 198/847 X |
| 3,612,256 | 10/1971 | Limbach et al. | 198/847 |
| 4,326,905 | 4/1982 | Tanaka | 156/149 |
| 4,397,985 | 8/1983 | Marshall et al. | 156/910 X |
| 4,518,647 | 5/1985 | Morrison . | |
| 4,526,637 | 7/1985 | Long | 198/847 X |

FOREIGN PATENT DOCUMENTS

| | | |
|---|---|---|
| 1625850 | 2/1970 | Fed. Rep. of Germany . |
| 2034506 | 2/1971 | Fed. Rep. of Germany . |
| 1635467 | 1/1972 | Fed. Rep. of Germany . |
| 2234915 | 1/1974 | Fed. Rep. of Germany . |
| 3035883 | 1/1982 | Fed. Rep. of Germany . |
| 700850 | 11/1929 | France . |
| 792135 | 1/1933 | France . |
| 1272389 | 4/1972 | United Kingdom . |

*Primary Examiner*—Robert J. Spar
*Assistant Examiner*—James R. Bidwell
*Attorney, Agent, or Firm*—Breneman & Georges

[57] ABSTRACT

The present invention provides a method for producing a driving or conveyor belt made of rubber or a rubberlike material, having a reinforcing member consisting of one or more plies of textile fabric comprising warp and woof threads of a synthetic material, selected from the group comprising polyester, polyamide and/or aramid or a combination thereof, wherein threads, particularly woof threads, are used for weaving the textile fabric, which have been covered entirely or partially by a coating of rubber or rubberlike material prior to being woven into the textile fabric.

18 Claims, No Drawings

METHOD FOR PRODUCING A DRIVING OR CONVEYOR BELT

BACKGROUND OF THE INVENTION

1. Field Of The Invention

The invention pertains to a method for producing a driving or conveyor belt made of rubber or rubberlike material, having a reinforcing member consisting of one or more layers or textile fabric comprising warp and woof threads of a synthetic material, selected from the group comprising polyester, polyamide and/or aramid or a combination thereof.

2. Description Of The Related Art

To achieve increased strength known prior art driving or conveyor belts employ two or more reinforcing members to achieve a degree of belt strength up to a maximum of 1.600 N/mm width. The value of 1.250 N/mm per width should preferably not be exceeded in such belts. To each a higher degree of strength the number of reinforcing members have to be increased, thus leading to a further increase in thickness of the belt which requires an undesirably large driving and/or guide rollers.

Additional known belts have a single reinforcing member that, in order to reach the required degree of strength, has a thickness of several millimeters. Such belts also require the imbedding of the reinforcing member in the synthetic material or rubber or rubberlike material, to accomplish the necessary binding of warp and woof threads for a lasting durability, the desired low elasticity as well as a satisfactory resistance against tearing out of connecting claws. This requires the complete saturation of the reinforcing member with synthetic material or rubber or rubberlike material. The necessary saturating of the reinforcing member, that is required for such a belt, however, can only be achieved with synthetic compositions, for instance polyvinyl chloride, considering the bulkiness of the reinforcing member. As compared to rubber or rubberlike material synthetic materials glide relatively easily on the driving or guide rollers and show an increased degree of wear, the cover layers of high quality belts should as usual be composed of rubber or rubberlike material. The binding process of the cover layers of rubber or rubberlike material to the synthetic material for instance polyvinyl chloride, of the embedding layer of the reinforcing member, however, is very expensive and complicated. It e.g. presupposes the use of natural fibers in the warp and woof elements of the reinforcing member. The use of natural fibers, however, conceals the troublesome disadvantages of absorption of moisture, the process of rotting and weakening binding. The binding in the contact surfaces between the synthetic material of the reinforcing member and rubber or rubberlike material of the cover layers is particularly susceptible.

The use of a reinforcing member of sufficient strength and thickness, which is made exclusively of synthetic threads, such as polyester, polyamide and/or aramid threads and combinations thereof, which is embedded in a rubber or rubberlike material has not been possible to date as the rubber solution will not penetrate the reinforcing member, which nevertheless would be a necessity to achieve the requisite durability, low elasticity as well as resistance to the tearing out of connecting claws.

SUMMARY OF THE INVENTION

The invention pertains to a method for producing a driving or conveyor belt composed of a rubber or a rubberlike material having a reinforcing member that consists of one or more plies of textile fabric comprising warp and woof threads of a synthetic material, selected from the group comprising polyester, polyamide and/or aramid or a combination thereof, wherein said threads, particularly the woof threads, have been covered entirely or partially by a coating of rubber or rubberlike material prior to being woven into the textile fabric.

DESCRIPTION OF THE PREFERRED EMBODIMENTS

The purpose of the invention therefore is to provide a method of the kind previously discussed, which provides a simple process for the construction of a driving or conveyor belt, which features a reinforcing member that is composed of synthetic threads, such as polyester, polyamide and/or aramid threads or a combination thereof, which are embedded in rubber or a rubberlike material, with a cover layer also made out of rubber or a rubberlike material. Hence the threads in the reinforcing member shall not be composed of natural fiber materials and it shall not be necessary to bind layers of synthetic material with layers of rubber or rubberlike material.

The invention solves the problem previously discussed essentially by using such threads, particularly woof threads, that have been entirely or partially covered by a coating of rubber or rubberlike material prior to being woven into the textile fabric before incorporating the textile fabric composed of one or more plies to form the reinforcing member between contact and/or cover layers of rubber or rubberlike material. Thus the problem of a complete saturating of the relatively thick reinforcing elements of synthetic material with rubber mixtures is eliminated as rubber or rubberlike material already is incorporated in the spaces of the textile fabric due to the prior coating of the threads, particularly the woof threads. Such a prefabricated textile fabric can simply be embedded in contact layers of rubber or rubberlike material respectively covered with cover layers of rubber or rubberlike material and then subsequently vulcanized. A saturating of the reinforcing member is no longer necessary, nor is the creation of contact between rubber layers and layers of synthetic material. The principles of the invention were initially designed for belts with one reinforcing member but not restricted to it. In the application of the invention it is also possible, as with the example of belts with more than one reinforcing members having one or more plies, to eliminate at least one of the reinforcing members and to construct the remaining reinforcing members in a sufficient thickness to obtain the required strength of the entire belt.

It is particularly advantageous if the coating that covers the threads, in particular the woof threads, consists of unvulcanized or only pre-vulcanized rubber or rubberlike material and only after being woven into the textile fabric, is vulcanized or terminally vulcanized, for instance in combination with the vulcanization of added cover and/or contact layers of rubber or rubberlike material. When vulcanizing or terminally vulcanizing the belt, the rubber or the rubberlike material covering the threads under pressure flows into the remaining empty spaces in the textile fabric and fills these so that an extraordinarily reliable rubber binding the warp threads with each other and the woof threads with each other as well as between warp and woof threads is formed. The coating of rubber or rubberlike material which the threads, particularly the woof threads, should already be covered with prior to weaving into the textile fabric, preferably has a thickness of approximately 0.1 to 1 mm. The layer of rubber or rubberlike material for instance can be applied by running the threads, in particular the woof threads, to be coated through a rubber-coating bath.

Furthermore it is desirable to use a textile fabric with a rubber-compatible preparation as a reinforcing member and cover it with contact layers and/or cover layers or rubber or rubberlike material and then to vulcanize, resulting in an intimate mixture of the rubber layers. With such rubber-compatible preparations a particularly desired strength can be obtained betwen synthetic threads and rubber. In general this preparation has been carried out at relatively high temperatures which would have the undesirable effect of terminally vulcanizing a coating of rubber or rubberlike material by which the threads, particularly woof threads, have been coated with prior to their weaving into the textile fabric. Under such circumstances the flow of rubber or rubberlike material previously applied to the threads as a coating would no longer be possible in vulcanizing with contact layers or cover layers or rubber or rubberlike material.

To overcome this disadvantage a further feature of this invention is the provision for a pretreatment of the not yet rubbercoated and the uncoated warp and woof threads with a rubbercompatible preparation prior to being woven into textile fabric. This avoids a premature undesirable vulcanization of the rubber or rubberlike material of the coating of the threads.

To solve the problems described, it is also possible to have the preparation treatment take place only after weaving the reinforcing member, in which case the aforesaid preparation treatment is carried out, however, at a temperature of not higher than 130° C. for an adequately prolonged duration of the preparation treatment. While conventionally the preparation treatment of synthetic fabric such as with resorcinol formaldehyde in an aqueous solution takes place at a temperature of approximately 180°-200° C. for a preparation time of approximately 60-120 seconds, in order to condense the water of the preparation bath, in accordance with this further embodiment of the invention, the preparation is only carried out at such temperature as to prevent the undesired vulcanization of the coating or rubber or rubberlike material covering the threads, particularly the woof threads. An adequately prolonged preparation time is required to work with such low temperatures.

Since the rubber-coated threads, particularly woof threads, may be sticky, the invention in its preferred application suggests subsequent evaporation of the solvent to apply onto these precoated threads, particularly onto the precoated woof threads, separating or gliding agent that will be absorbed by the rubber or rubberlike material when vulcanizing the reinforcing member with contact layers and/or cover layers. This facilitates the handling of the threads and the woven reinforcing member thereof when producing the belts and, however, prevents the difficulty of binding the rubber-coated threads to the embedding rubber layer. For such a follow-up treatment of the rubber-coated threads with a separating or gliding agent, for instance zinc stearate and the like would be suitable.

What is claimed is:

1. A method for producing a driving or conveyor belt made of rubber or a rubberlike covering layer and a reinforcing member consisting of one or more plies of textile fabric comprising the step of forming each of said textile fabric plies having a plurality of interwoven warp and woof threads of a synthetic material, said synthetic material selected from the group consisting of polyester, polyamide and/or aramid or a combination thereof, wherein at least one of said plurality of interwoven warp threads or one of said plurality of interwoven woof threads are covered entirely or partially by a coating covering of rubber or rubberlike material prior to being interwoven into said textile fabric.

2. A method according to claim 1, wherein the coating covering the threads, in particular the woof threads, consists of un-vulcanized or pre-vulcanized rubber or a rubberlike material which is vulcanized or terminally vulcanized after the weaving process of the textile fabric, for instance when vulcanizing with applied contact layers or cover layers.

3. A method according to claim 1 or 2, wherein a textile fabric having a rubber-compatible preparation is used as a reinforcing member which is covered with contact layers and/or cover layeres composed of rubber or rubberlike material and then vulcanized, wherein the woof threads and/or warp threads not or not yet covered by a coating or rubber or rubberlike material are prepared already prior to being woven into the textile fabric.

4. A method according to claim 1 or 2, in which the textile fabric prior to its being provided and vulcanized with the contact layers and/or cover layers of rubber or rubberlike material is treated with a rubber-compatible preparation, wherein the treatment is carried out at a temperature not higher than approximately 130° C. at an adequately prolonged duration of treatment.

5. A method according to claims 1 or 2 wherein after covering the threads of which the textile fabric is composed of with a coating of rubber or rubberlike material, a separating or a gliding agent is applied onto the threads, particularly onto the woof threads, which is absorbed by the rubber or rubberlike material of the layers when vulcanizing with the contact layers and/or cover layers made of rubber or rubberlike material.

6. A method according to claim 3 wherein after covering the threads of which the textile fabric is composed of with a coating of rubber or rubberlike material, a separating or a gliding agent is applied onto the threads, particularly onto the woof threads, which is absorbed by the rubber or rubberlike material of the layers when vulcanizing with the contact layers and/or cover layers made of rubber or rubberlike material.

7. A method according to claim 4 wherein after covering the threads of which the textile fabric is composed of with a coating of rubber or rubberlike material, a separating or a gliding agent is applied onto the threads, particularly onto the woof threads, which is absorbed by the rubber or rubberlike material of the layers when vulcanizing with the contact layers and/or cover layers made of rubber or rubberlike material.

8. A method for producing a driving or conveyor belt made of rubber or rubberlike material, having a reinforcing member consisting or one or more layers of textile fabric comprising forming a reinforcing member having one or more plies of a textile fabric said plies of textile fabric constructed of a plurality of interwoven warp and woof threads of a synthetic material wherein at least some of said plurality of warp and woof threads have been covered entirely or partially by a coating of rubber or rubberlike material prior to being interwoven into said textile fabric and then covering said one or more plies of textile fabric with cover layers of rubber or rubberlike material an then finally vulcanizing the resulting product.

9. A process for the manufacture of a driving or conveyor belt covered with a rubber or rubberlike material comprising the steps of:
  (a) coating a first set of threads of a synthetic material selected from the group consisting of polyester, polyamide, aramid or a combination thereof with a rubber or rubberlike composition;
  (b) interweaving said first set of threads with a second set of threads of a synthetic material selected from the group consisting of polyester, polyamide, aramid or a combination thereof to form a woven textile fabric having woof and warp threads;
  (c) forming one or more reinforcing sections of a driving or conveyor belt composed of one or more plies of said woven textile fabric;
  (d) covering said one or more reinforcing sections of said driving or conveyor belt with one or more plies of a rubber or rubberlike material; and
  (e) vulcanizing said reinforcing sections and said covering to form said driving or conveyor belt.

10. The process of claim 9 wherein said first set of threads are interwoven to form said woof threads.

11. The process of claim 9 further comprising the step of coating said second set of threads with a rubber or rubberlike composition prior to said interweaving step.

12. The process of claim 9 or 11 further comprising the step of vulcanizing or partially vulcanizing said first set of threads after said interweaving step.

13. The process of claim 9 or 11 further comprising the step of treating said interwoven textile fabric with a rubber compatible preparation.

14. The process of claim 13 wherein said step of treating is performed at a temperature of not higher than about 130 degrees centigrade.

15. The process of claim 9 or 11 further comprising the step of applying a gliding agent to said first set of threads prior to said interweaving step for absorption by said rubber or rubberlike covering material upon said vulcanizing step.

16. The process of claim 15 further comprising the step of applying said gliding agent to said second set of threads prior to said interweaving step for absorpton by said rubber or rubberlike material upon said vulcanizing step.

17. The process of claim 15 wherein said gliding agent is zinc stearate.

18. The product produced by the process of claim 9 or 11.

* * * * *